United States Patent Office 3,401,857
Patented Sept. 17, 1968

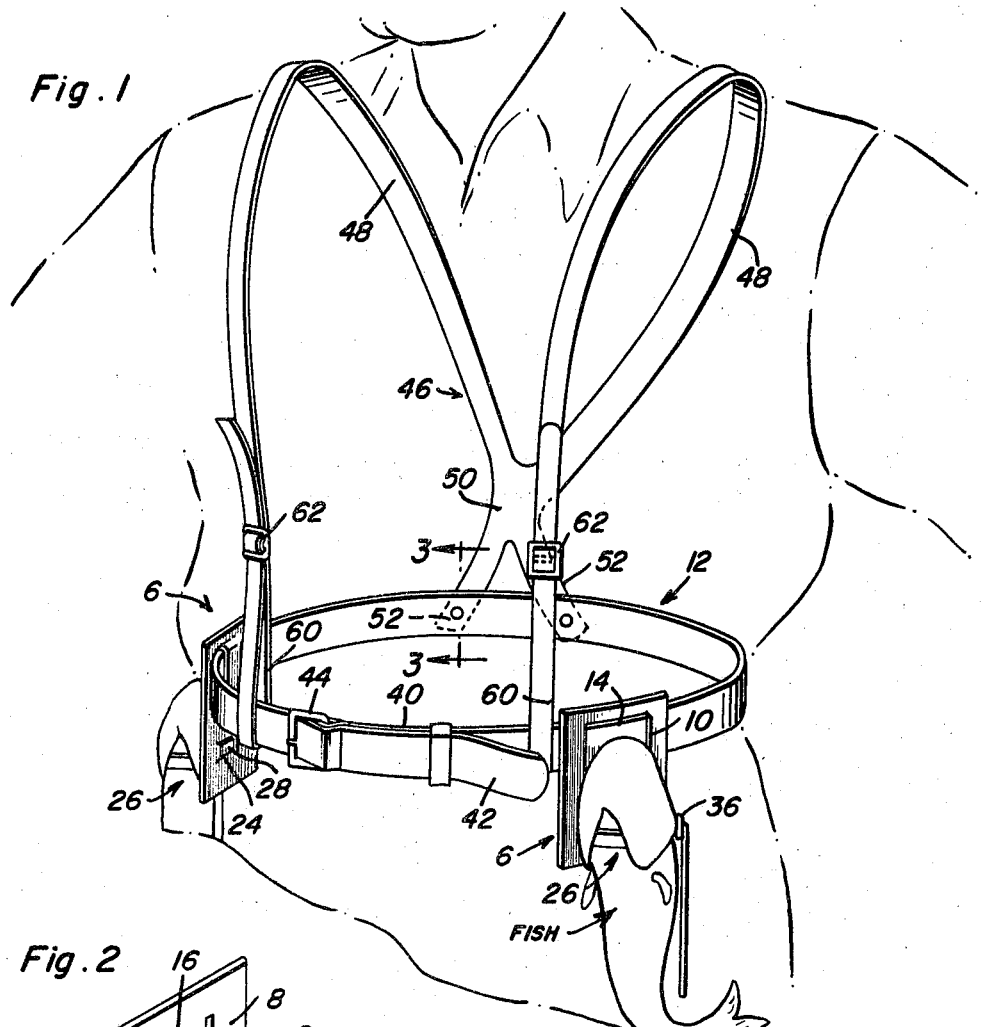
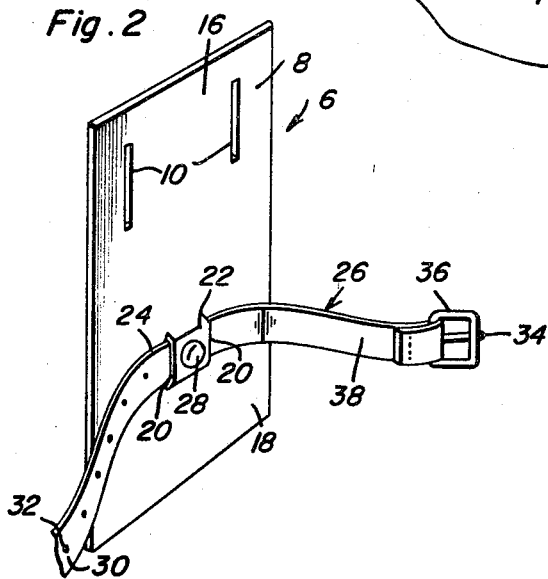
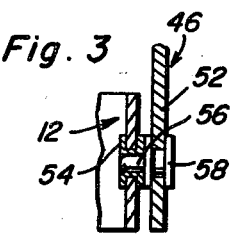

3,401,857
BODY ENCIRCLING BELT WITH
FISH CARRIER MEANS
Russell R. Wilson, 131 W. 13th St., and William G. Wilder,
920 S. I St., both of Port Angeles, Wash. 98362
Filed Oct. 5, 1966, Ser. No. 584,528
1 Claim. (Cl. 224—7)

ABSTRACT OF THE DISCLOSURE

The hereindisclosed equipment has to do with a suitable body encircling belt, an optionally usable harness, and fish carriers detachably and adjustably hung on the belt. Each carrier comprises a leather or an equivalent apron-like flap whose upper half-portion is slotted to accommodate the belt. Primarily, the flap is unique in that its lower half-portion has a fixed strap which encircles and secures the fish atop the flap in a manner which does not hamper walking, wade fishing, angling or other activities of the angler.

---

This invention relates to body-attached angling equipment for practical and convenient use by a fisherman and has to do, more particularly, with improved fish carrier means which is such in construction and adaptability that its presence on the wearer's body does not interfere with or objectionably curb or hamper walking, wading, rowing, casting or other freedom activities of the wearer.

It has been observed that an angler's success can and often does depend on the clothing he wears, tackle, climate, equipment at hand, and whatever is feasible and handily available for the fishing expedition at hand. In the instant matter and whether the prospective user is wearing waders, warm or cold weather clothing or the like the herein closed equipment can be and is readily and satisfactorily harnessed in place and is therefore worn in an out-of-the-way manner over the user's clothing, and, as above comprehended, provides the wear with easy-to-use facilities for carrying caught fish on his person until he is prepared to detach the same for stringing, transportation or other purposes.

More explicitly, the invention pertains to novel fish carriers and means through the medium of which said carriers are capable of being suported and harnessed in a novel manner upon the fisherman. In carrying out the concept the structure which has been devised and adapted for use bears general relationship, but only broadly speaking, to the harness-held game carrier shown in the Reishus patent, 2,394,805, and in the relatively complicated and therefore broadly non-analogous carrying and supporting harness revealed in a patent to Cumings, 2,018,606.

In carrying out the present invention and as will be later more clearly appreciated, novelty is predicated on the unique fish carriers and means, more specifically a waist-encircling belt and an optional harness and wherein the carriers are constructed to be detachably and adjustably hung and suspended on the belt at circumferentially spaced places.

Also, and as will be set forth in the following specification, each carrier is characterized by a flexible leather or equivalent waterproof apron-like flap. This flap is characterized by an upper half portion provided with belt accommodating slots through which a coacting portion of the body encircling belt is threaded. In addition, the flap has a lower depending half-portion equipped with a suitable proportionally constructed but appropriate belt-like strap. The median portion of the strap is suitably affixed to a median portion of the flap and the free end portions are provided with strap end adjusting and connecting means including, for example, a buckle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of fish carrier means, including the belt and harness, constructed in accordance with the principles of the present invention.

FIG. 2 is a view in perspective and on an enlarged scale of one of the carriers by itself, that is, with the strap open and the fish omitted.

FIG. 3 is an enlarged detail or fragmentary section with parts in elevation taken on the plane of the vertical line 3—3 of FIG. 1.

Broadly and briefly the essence of the invention resides in the fish carriers two of which are shown, as exemplary of the concept, in FIG. 1.

The embodiment of the carrier preferred is that which is detailed in FIG. 2 comprising a vertically elongated rectangular or equivalent flat-faced flexible member which is conveniently designated as a carrier flap 6 and which, more explicitly, comprises an apron-like shield of the approximate size suggested in FIG. 1. This flap can be somewhat longer than that illustrated so that it may have the additional purpose of a trousers or clothing protector shield. It has an upper half portion 8 provided with a pair of complemental slots 10 which are of a size to permit the portions of a waist encircling belt to be passed or threaded therethrough. The belt is of the type shown in FIG. 1 and is denoted generally by the numeral 12. That portion 14 (FIG. 1) which is illustrated passes through the slots and bridges the intervening portion 16 of the flap. The lower half portion 18 is centrally provided with spaced parallel slits 20 which define an intervening loop 22 through which a median portion 24 of the fish hold-down or retaining strap 26 is positioned and riveted or otherwise held in place as denoted at 28. One end portion 30 of the strap is provided with holes 32 to accommodate the tongue 34 of a belt buckle 36 which is carried by the end portion 38 of the strap. This strap 24 can be referred to as a secondary or auxiliary belt, that is "auxiliary" in the sense that it is supplemental to and smaller than the waist encircling belt 12. The waist encircling belt is of suitable construction and the end portions 40 and 42 are overlapped and are adjustably connected by a buckle 44. Two of the carriers 6 are shown on the belt 12 in FIG. 1. It is understood, however, that any number of these carriers can be used to suspend and hold the fish in the manner illustrated.

The optional over-the-body harness is denoted by the numeral 46 and it is of leather or suitable construction and is characterized by shoulder straps 48 to the left and right and which have their lower rearward ends joined by a web 50 with component terminal portions 52 diverging and secured to the belt in the manner shown in FIG. 3. With reference to FIG. 3 it will be noted that a grommet is provided at 54 which serves as a keeper for the keeper pin 56 on the headed stud 58. It follows that the end portions of the harness can be attached or detached in a self-evident manner. As to the forward end portions of the shoulder straps these are formed into loops 60 which are detachably and adjustably connected with the waist encircling belt with the free end portions buckled and held in place as at 62.

It is reiterated that the carriers while almost invariably used in conjunction with a waist or encircling belt 12 need not necessarily utilize the additional or optional harness 46 and the invention is to be construed accordingly.

The fish carrier flaps 6 can be made of heavy leather or plastic or other equivalent and suitable moisture-resisting material. The strap 26 is intended to encircle the head of the fish with component portions thereof underneath the gills in a manner that a fish can be buckled or strapped in place on and suspended by the belt-supported carrier flap 6.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an adjustable waist encircling belt having forward ends provided with means for adjustably joining and separably connecting said ends, a suspension harness embodying left and right shoulder straps having lower rearward ends crossing each other and diverging outwardly and operatively connected to and adapted to support a rear median portion of said waist encircling belt, and also having forward end portions formed into stirrup-like loops, said loops encircling and suspending coacting forward circumferentially spaced portions of said body encircling belt and having upwardly directed free ends adjustably buckled to cooperating portions of their respectively cooperable forward end portions, a plurality of fish carriers, each carrier comprising a substantially rectangular flexible waterproof leather apron-like flap of a size to permit a caught fish to be hung and carried thereon, said flap having upper and lower spaced half-portions, said upper half-portion having a pair of aligned companion belt slots, a coacting portion of said belt being passed through said slots and adjustably connecting the flap to said belt, the lower half-portion of said flap depending below the level of said belt, a median portion of said lower half-portion having a pair of relatively short slits forming an intervening forwardly outwardly projecting loop, said loop being spaced upwardly from the lower marginal edge of said lower half-portion and being confined to a locale midway between the vertical marginal edges of said flap, the aforementioned slots being parallel with each other and with said vertical marginal edges, of a length greater than the length of said slits and located to the left and right, respectively, of the midway position of said loop, and a relatively narrow but appropriately long belt-like fish embracing strap having a median portion passing through said loop and also said slits and riveted to said loop, said strap being of a prescribed width and length capable of encircling the head of a caught fish under the gills and having free ends provided with quick connectible and separable connecting means.

References Cited

UNITED STATES PATENTS

| | | | |
|---|---|---|---|
| 633,500 | 9/1899 | Hoffman | 224—7 |
| 770,761 | 9/1904 | Lemly | 224—22 |
| 2,394,805 | 2/1946 | Reishus | 224—7 |
| 2,528,501 | 11/1950 | Davis | 224—2 |
| 2,530,695 | 11/1950 | Helmert | 224—5 |
| 2,618,419 | 11/1952 | Vanish | 224—5 |
| 1,288,170 | 12/1918 | Pick. | |
| 2,437,585 | 3/1948 | Zimmern. | |
| 702,398 | 6/1902 | Bowyer | 224—2 |
| 1,427,849 | 9/1922 | Rayder. | |

HUGO O. SCHULZ, *Primary Examiner.*